United States Patent [19]

Bruce et al.

[11] Patent Number: 4,757,470

[45] Date of Patent: Jul. 12, 1988

[54] PATTERN GENERATION FOR A GRAPHICS DISPLAY

[75] Inventors: Kenneth E. Bruce, Nashua, N.H.; Thomas O. Holtey, Newton, Mass.; Gary J. Goss, Acton, Mass.

[73] Assignee: Honeywell Bull Inc., Minneapolis, Minn.

[21] Appl. No.: 68,701

[22] Filed: Jul. 1, 1987

Related U.S. Application Data

[63] Continuation of Ser. No. 637,680, Aug. 6, 1984, abandoned.

[51] Int. Cl.⁴ .................................................. G06F 3/14

[52] U.S. Cl. .................................... 364/900; 364/521; 340/723

[58] Field of Search ........................ 364/518, 521, 900; 340/721, 723

[56] References Cited

U.S. PATENT DOCUMENTS

| | | | |
|---|---|---|---|
| 31,200 | 4/1883 | Sukonick et al. | 340/724 |
| 3,976,982 | 8/1976 | Eiselen | 340/723 X |
| 4,028,695 | 6/1977 | Saich | 340/709 X |
| 4,197,590 | 4/1980 | Sukonick et al. | 364/900 |
| 4,481,594 | 11/1984 | Staggs et al. | 340/701 X |
| 4,484,187 | 11/1984 | Brown et al. | 340/723 X |

*Primary Examiner*—Gary V. Harkcom
*Assistant Examiner*—David L. Clark
*Attorney, Agent, or Firm*—George Grayson; John S. Solakian

[57] ABSTRACT

A display subsystem having a graphics capability includes a bit map memory for storing bits, each bit representing a displayed pixel. A read only memory stores words, each word representative of a pixel of a selected pattern which is used to fill out an area of the display thereby clearly identifying adjacent areas of the display to the operator. The selected patterns are displayed in a REPLACE, an OR or an EXCLUSIVE OR mode of operation.

10 Claims, 6 Drawing Sheets

| | | | BINARY 0 IN ROM 16 | | | | BINARY 1 IN ROM 16 | | | |
|---|---|---|---|---|---|---|---|---|---|---|
| | | | M0=1 | | M0=0 | | M0=1 | | M0=0 | |
| | M0 | M1 | 3 | 2 | 1 | 0 | 3 | 2 | 1 | 0 |
| REPLACE | 0 | 0 | – | – | 0 | 0 | – | – | 0 | 1 |
| OR | 0 | 1 | – | – | 1 | 0 | – | – | 0 | 1 |
| EXCLUSIVE OR | 1 | 0 | 1 | 0 | – | – | 1 | 1 | – | – |

| CODE | |
|---|---|
| BMOD00+00 | M0 |
| BMOD01+00 | M1 |
| PROMD0+00 | 0 |
| PROMD1+00 | 1 |
| PROMD2+00 | 2 |
| PROMD3+00 | 3 |
| DON'T CARE | — |

FIG. 4

PATTERN GENERATION FOR A GRAPHICS DISPLAY

This application is a continuation, of application Ser. No. 637,680, filed Aug. 6, 1984, now abandoned.

BACKGROUND OF THE INVENTION

1. Field of the Invention

This invention relates generally to a graphics display in a data processing system, and more particularly to the automatic generation of patterns to fill out areas of the display.

2. Description of the Prior Art

Graphics and alphanumeric text are displayed visually in many business applications. This allows the relationship between many variables of the business to be presented in pie chart or bar graph form. The graphics may also be used to display and manipulate mechanical or electronic designs.

In order to readily differentiate between areas of the graphics display adjacent areas are "painted" with a different pattern. As an example, a three sector pie chart may have one sector painted with a dot pattern, the second sector painted with horizontal lines, and the third sector painted with diagonal lines.

The prior art uses a software technique with different algorithms painting different patterns. This has the disadvantage of using up valuable memory space and requiring excessive processing time thereby reducing overall system throughput.

OBJECTS OF THE INVENTION

It is a primary object of the invention to have an improved display system.

It is an object of the invention to have an improved graphics display system.

It is another object of the invention to have an improved graphics system which uses improved apparatus for automatically "painting" areas of the display with various patterns.

SUMMARY OF THE INVENTION

A bit map memory stores pixels (bits) in bit addressable locations. An image of the display is stored in the bit map memory since each location represents a point of the display.

A read only memory (ROM) stores the various patterns used to paint an area of the display, the boundaries of which are defined by various areas, and lines appearing on the display. These patterns include, typically, diagonals, crosshatching, dots, vertical lines, horizontal lines, and grey scale variations.

A number of modes of operation include a replacement mode, an OR mode and an exclusive OR mode. The replacement mode replaces the selected pattern previously in the area. The OR mode superimposes the selected pattern on the existing pattern and the exclusive OR mode superimposes the selected pattern on the existing pattern, except that a pixel from the ROM superimposed on the pixel in the bit map memory location cancels the pixel in the bit map memory location, resulting in that pixel not being displayed.

A mode register receives mode control signals under a microprocessor control. The ROM receives a first mode signal, pattern select signals, color select signals, and row and column signals under microprocessor control to address a ROM location storing bits representative of the desired pattern.

Multiplexers under the control of a second mode control signal select the appropriate ROM output signals which are applied to decision logic.

The bit location of the bit map memory is addressed under microprocessor control and the pixel read from that location is applied to the decision logic. An output from the decision apparatus is applied to the bit map memory to be written in the addressed bit location to supply one pixel of the new pattern result in accordance with the mode of operation.

BRIEF DESCRIPTION OF THE DRAWINGS

The novel features which are characteristic of the invention are set forth with particularity in the appended claims. The invention itself, however, both as to organization and operation may best be understood by reference to the following description in conjunction with the drawings in which:

FIG. 4 is a chart showing the various modes of operation;

DESCRIPTION OF THE PREFERRED EMBODIMENT

Figure 1:
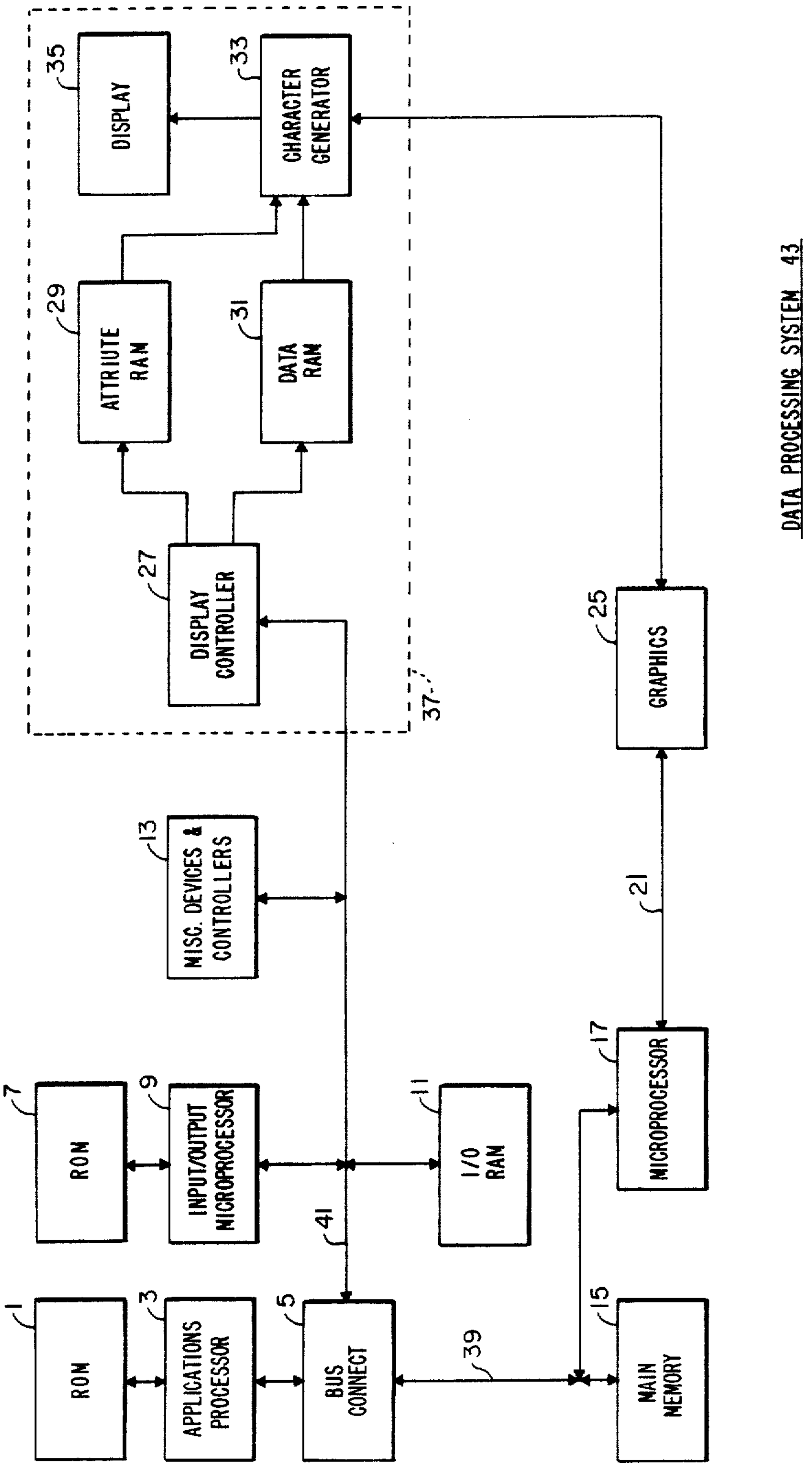
FIG. 1 is a block diagram of a typical data processing system.

FIG. 1 describes a typical data processing system 43 which includes a graphics capability in its display subsystem.

An applications processor 3 controlled by firmware stored in a read only memory (ROM) 1 executes applications programs. The applications processor 3 is coupled to a main memory 15 via bus connect 5 and a bus 39.

An input/output (I/O) microprocessor 9 controlled by firmware stored in a ROM 7 executes input/output instructions required for the execution of applications programs by the applications processor 3.

Typically main memory 15 stores the operating system, the applications programs and the information upon which the applications program operates. When access to a device is required, the applications processor 3 stores input/output instructions in an I/O random access memory (RAM) 11. I/O microprocessor 9 is responsive to the I/O instructions stored in I/O RAM 11 to control the transfer of information between main memory 15 and a peripheral device of miscellaneous devices and controllers 13. Typical devices (not shown) are floppy disks, printers, keyboards, hard disks, and communication terminals.

A display subsystem 37 may be operative in conjunction with a keyboard to display information stored in main memory 15 and I/O RAM 11 on a display 35. typically a cathode ray tube display. Display subsystem 37 includes a display controller 27 which interfaces with I/O RAM 11 and main memory 15 under the control of I/O microprocessor 9 for the transfer of information for display. The information for display is stored in a data RAM 31. A character generator 33 receives the information from data RAM 31 and converts it to a series of dots which is timed to the raster scan of the display 35 to shape the alphabetic or numeric (text) characters. An attribute RAM 29 typically provides for the underlining, blanking, and inverting of selected characters.

The bus connect 5, I/O microprocessor 9, I/O RAM 11, miscellaneous devices and controller 13 and display controller 27 are all coupled in common to a bus 41 which includes an 8 bit data bus.

A microprocessor 17, typically an Intel 8086 microprocessor, is coupled to main memory 15 and bus connect 5 by a bus 39 which includes a 16 bit data bus. Microprocessor 17 runs under MSDOS (operating system) which is stored in main memory 15. Microprocessor 17 is described in the 8086 Family Users Manual, October 1979 and published by Intel Corporation, 3065 Bowers Avenue, Santa Clara, Calif. 95051.

A graphics option 25 is coupled to microprocessor 17 by a bus 21 which includes an 8 bit data bus. Buses 21, 39 and 41 also include the necessary address and control signals.

The graphics option is aimed at the business graphics marketplace wherein the ability to generate and modify pie charts, line charts and the like in conjunction with the applications program being executed by applications processor 3 is a requirement. The graphics option 25 controls the display of point addressable graphics on display 35. This is accomplished by applications processor 3 calling on the graphics option 25 by sending command information to main memory 15. Microprocessor 17 is responsive to the command information to control graphics option 25 to send graphics information to the character generator 33.

Figure 2:
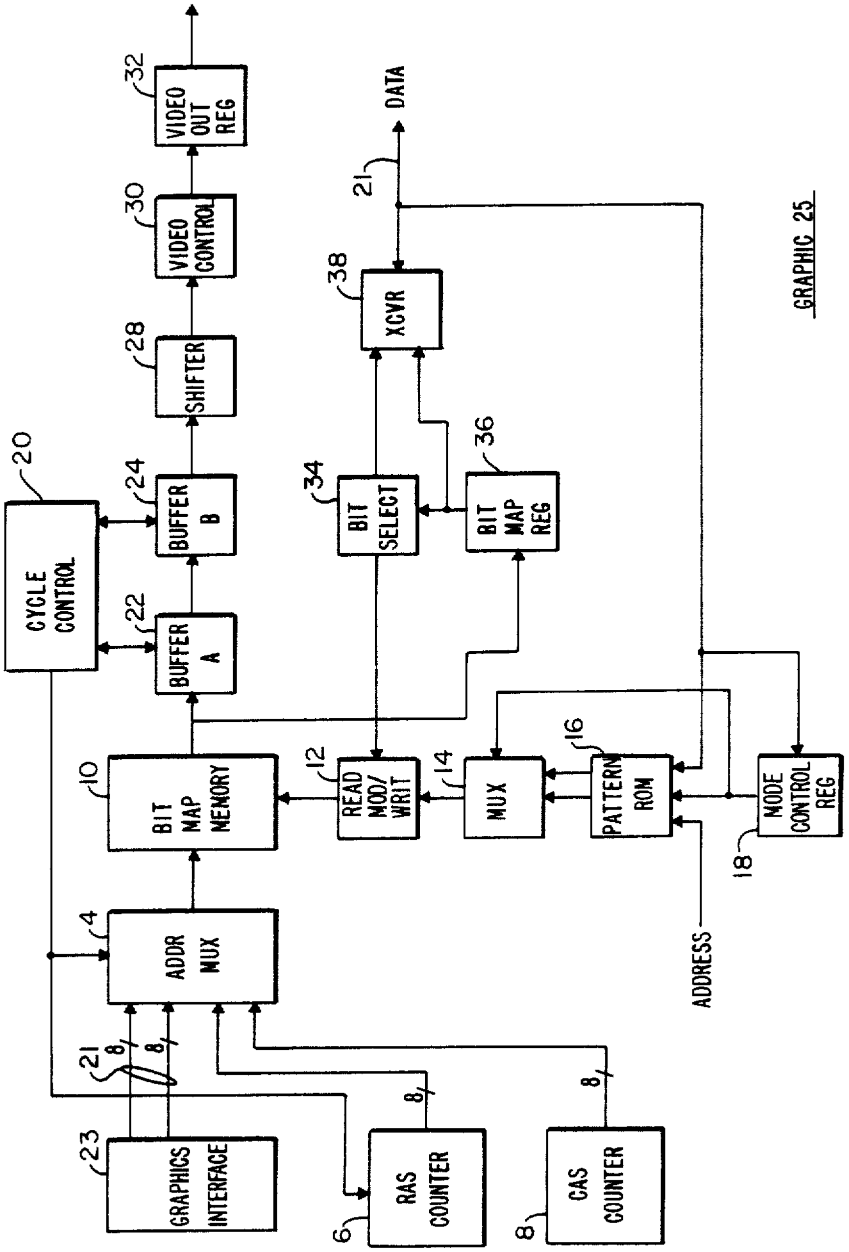
FIG. 2 is a block diagram of the graphics subsystem.

FIG. 2 shows a block diagram of the graphics option 25. A bit map memory 10 stores an image of the display screen of display 35. Bit map memory 10 stores 720 pixels (bit positions) for each of 300 scan lines for a total of 216,000 pixels. Bit map memory 10 is addressed via an address multiplexer 4 which selects 16 address signals, 8 at a time, from graphics interface 23, or 8 signals from a row address select (RAS) count 6 and 8 signals from a column address count select (CAS) count 8. Bit map memory 10 is made up of 8 64K×1 dynamic RAMs, storing 216,000 pixels for display on display 35. Also stored are a number of control bits.

A pattern ROM 16 stores bits representative of the patterns that may be displayed. The patterns include vertical lines, horizontal lines, diagonal lines, cross-hatch lines, dotted areas and solid areas.

A mode control register 18 stores mode signals which indicate a replace, an OR or an exclusive OR mode of operation. During the replace operation, the pixel pattern selected from ROM 16 will replace the pixel pattern stored in the bit map memory 10 at specified address locations. During the OR operation, the pixel pattern selected from ROM 16 is superimposed (OR'd) over the pixel pattern stored in the bit map memory 10 at the specified addresses. During the exclusive OR operation, the pixel pattern selected from ROM 16 is superimposed over the pixel pattern stored in the bit map memory 10 at the specified addresses except no pixel will appear where a pixel from ROM 16 is written over a pixel stored in bit map memory 10.

A multiplexer 14 selects predetermined output signals from ROM 16 in accordance with the state of the mode signals from mode control register 18. Eight bits are read from bit map memory 10 and stored in a bit map register 36. A bit select 34 applies a selected bit to a read modify/write 12, the state of which depends upon the mode operation, the output of ROM 16, and the state of the bit from bit select 34. A transceiver (XCVR) 38 when enabled allows data bits from bit map register 36 and bit select 34 to be reflected on data bus 21.

The output signals of bit map memory 10 is double buffered in a buffer A 22 and a buffer B 22, serialized in a shifter 28 and the stream of bits applied to a video control 30. A video out register 32 output signal is applied to character generator 33, FIG. 1, for display on display 35.

A cycle control 20 controls the timing relationship between the addressing of bit map memory 10, by applying timing signals to RAS count 6, CAS count 8 and MUX 4, and the subsequent output signals stored in buffer A 22, and then transferred from buffer A 22 to buffer B 24.

The automatic generation of patterns to fill in a field uses the mode control register 18 to select the replace, OR or exclusive OR mode of operation. Software causes address and data signals to be generated which are applied to ROM 16 from graphics interface 23 to select the pattern which will fill out a field in bit map memory 10. MUX 14 selects the pattern bits from the ROM 16. The read modify/write 12 generates a binary ONE or binary ZERO bit to be written into bit map memory 10 at an address generated by the software in the graphics interface 23 and sent to the bit map memory 10 via MUX 4.

Figure 3:
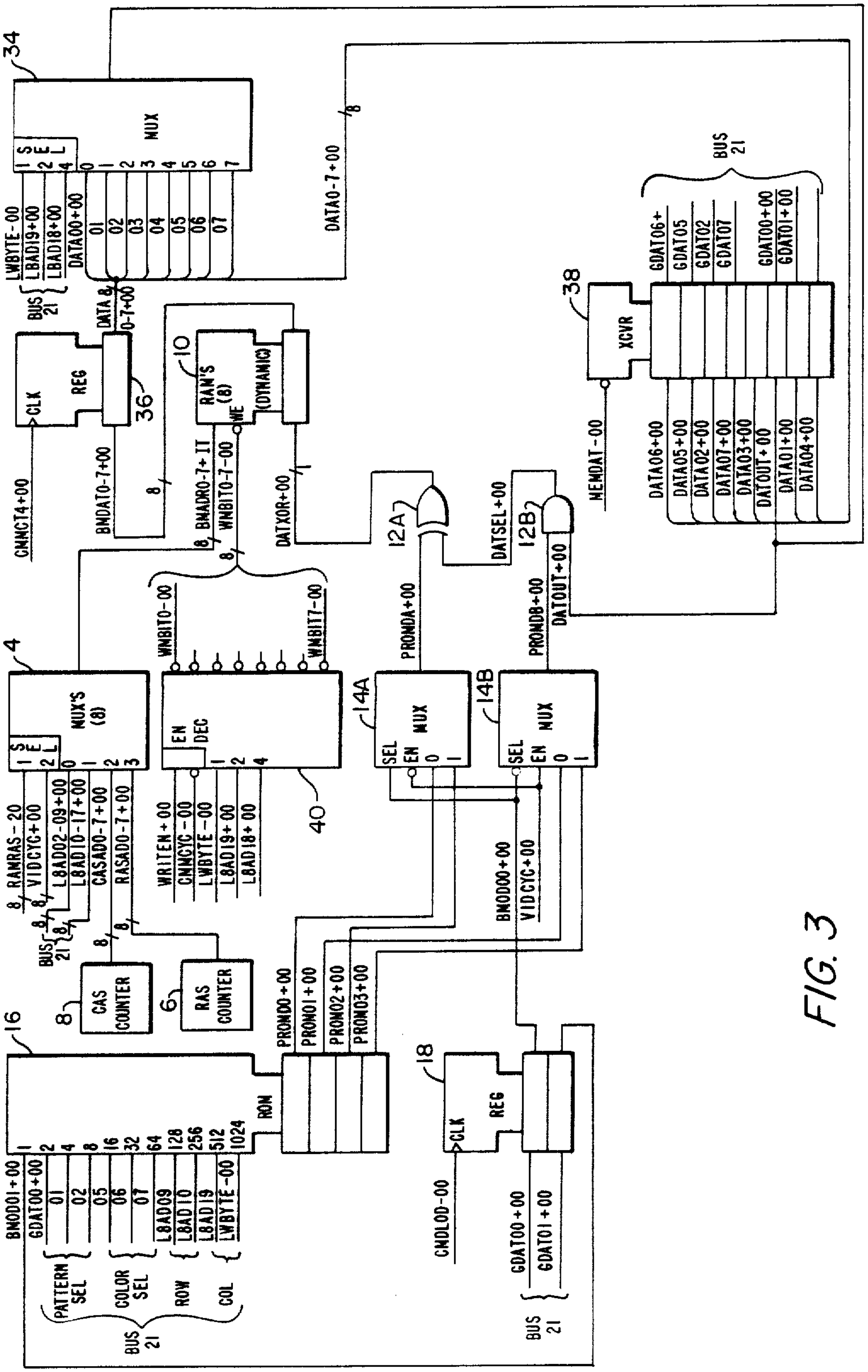
FIG. 3 is a diagram of the automatic pattern generating logic of the graphics subsystem.

FIG. 3 shows a detailed diagram of the automatic pattern generation logic which is used when it is desired to fill in a field outlined by previously written graphics. Typically a circle drawn with its sectors could be filled in with a different pattern. This would more clearly give the viewer a snapshot of the relative size of the sectors. Data signals GDAT00+00 and GDAT01+00 are received from microprocessor 17 over the data portion of bus 21 and stored in register 18 on the rise of clock signal CMDLOD−00. Signal CMDLOD−00 is a strobed signal received from graphics interface 23 indicating a graphics I/O command as differentiated from a read/write to bit map memory 10. Signals BMOD00+00 and BMOD01+00 are generated and identify the mode of operation in accordance with their states as shown in FIG. 4.

Signal BMOD00+00 is applied to a select terminal of a MUX 14A and a MUX 14B. MUX 14A selects either output signal PROMD0+00 or output signal PROMD2+00 from ROM 16. MUX 14B selects either output signal PROMD1+00 or output signal PROMD3+00. The video cycle signal VIDCYC+00 disables MUX's 14A and 14B during bit map memory 10 video cycle time.

Figure 5:
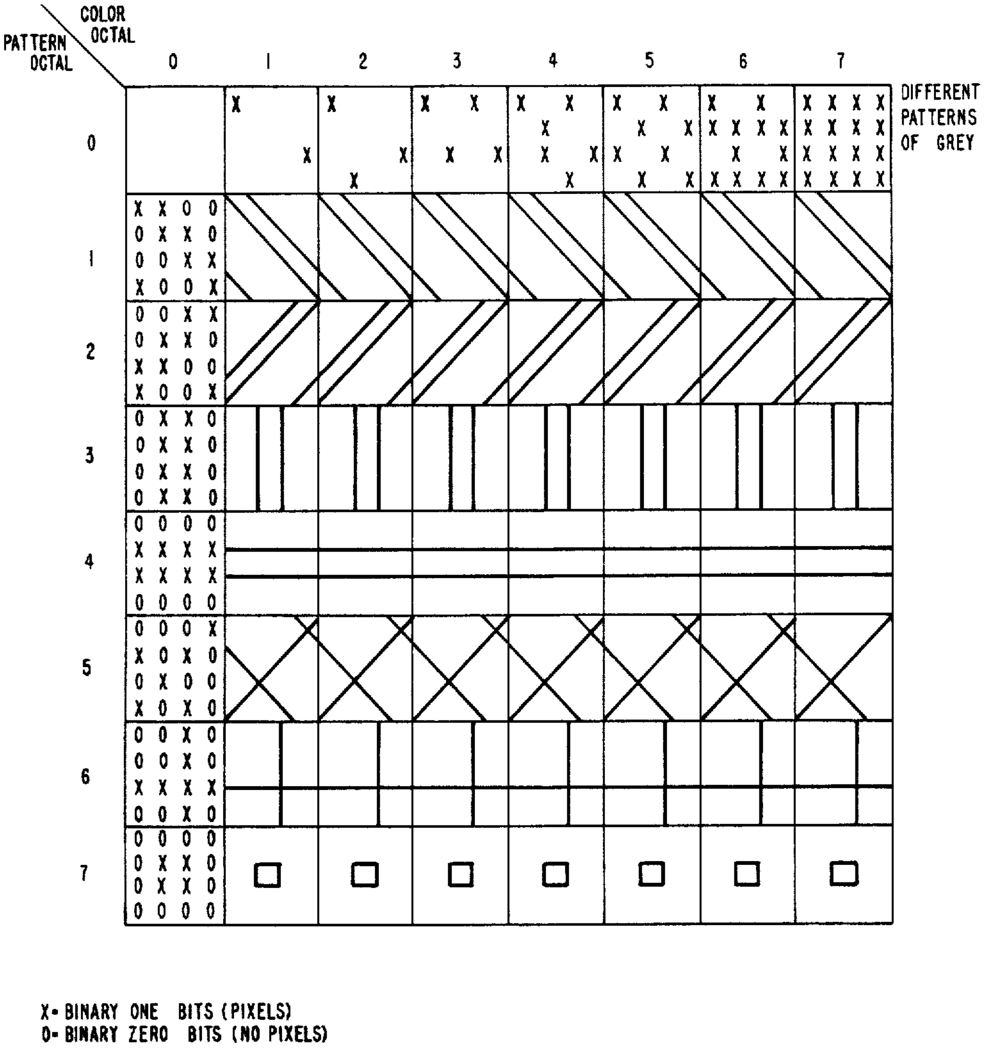
FIG. 5 is a chart showing the various patterns stored in a read only memory.

The software being executed by microprocessor 17 generates data signals GDAT00+00, GDAT01+00 and GDAT02+00 which are applied to the address terminals of ROM 16 to select one of the patterns of FIG. 5. Data signals GDAT05+00, GDAT06+00 and GDAT07+00 select one of the patterns of grey if the pattern bits are octal 0.

Address signals are generated by microprocessor 17 executing the software instructions to select an effective row and column of a data pattern stored in ROM 16 as shown in FIG. 5. Signals L8AD09+00 and L8AD10+00 select the row and signals L8AD19+00 and LWBYTE−00 select the column. For the replace operation, therefore, signal PROMD0+00 is selected by MUX 14A and signal PROMD1+00 is selected by MUX 14B. From FIG. 4, signal PROMD1+00 is at logical ZERO and signal PROMD0+00 will indicate the value of the selected pattern bit read from ROM 16. The output signal PROMDB+00 at logical ZERO applied to an AND gate 12B will force the output signal DATSEL+00 to logical ZERO. This will result in the state of signal PROMDA+00 applied to an exclusive OR gate 12A to be reflected in the state of output signal DATXOR+00 which will be written into a bit position of the 8 bit data byte addressed in bit map memory 10 (dynamic RAM) specified by signals L8AD18+00, L8AD19+00 and LWBYTE−00 which are applied to a write bit decoder 40. Decoder 40 is enabled by a write enable signal WRITEN+00 and a memory cycle signal CMMCYC−00 generated under microprocessor 17 control. Each of the eight output signals WMBIT0−00 through WMBIT7−00 enables its respective memory element of the eight memory elements making up RAM 10 to store the signal DATXOR+00.

For the OR operation, the addressed bit is read from the bit map memory 10 by reading out a byte of information and storing the byte in register 36 on the rise of clock signal CMMCT4+00. Address signals LWBYTE−00, L8AD18+00 and L8AD19+00 applied to MUX 34 select the bit which appears on signal DATOUT+00. Signal DATOUT+00 is applied to AND gate 12B.

For the OR operation from FIG. 4, signals PROMD0+00 and PROMD1+00 are again selected by MUX's 12A and 12B respectively. since mode signal BMOD00+00 is at logical ZERO. Assuming a binary ONE was read from both bit map memory 10 and ROM 16, then signal PROMDA+00 is at logical ONE and signal PROMDB+00 is at logical ZERO. The output signal DATSEL+00 is then at logical ZERO and a binary ONE is written into bit map memory 10 via exclusive OR gate 12A and signal DATXOR+00.

Assume a binary ONE is in bit map memory 10 and a binary ZERO is in ROM 16. Signal PROMDB+00 is then at logical ONE and signal PROMDA+00 is at logical ZERO. Therefore, signal PROMDA+00 is at logical ZERO and signal DATSEL+00 is at logical ONE, resulting in a binary ONE being written into bit map memory 10.

If a binary ZERO was read from bit map memory 10, then AND gate 12B is disabled and the state of signal PROMDA+00 will be written into bit map memory via signal DATXOR+00 and exclusive OR gate 12A.

Assuming an exclusive OR operation, signal BMOD00+00 at logical ONE results in MUX's 14A and 14B selecting signals PROMD2+00 and PROMD3+00 respectively. If both the bit map memory 10 and ROM 16 store a binary ONE, then signals PROMDB+00 and DATOUT+00 are at logical ONE. This forces output signal DATSEL+00 from AND gate 12B to logical ONE. Signal PROMDA+00 at logical ONE forces exclusive OR gate 12A output signal DATXOR+00 to logical ZERO, resulting in a binary ZERO being written into bit map memory 10.

Assume bit map memory 10 has a ZERO bit in the designated position, then AND gate 12B is disabled and the state of signal PROMDA+00 is written into bit map memory 10 via signal DATXOR+00 and exclusive OR gate 12A.

FIG. 5 shows the various patterns written in ROM 16. Each of the 64 boxes represents a 4 bit by 4 bit matrix. The pattern octal values reflect the states of signals GDAT00+00, GDAT01+00 and GDAT02+00. The color octal values reflect the state of signals GDAT05+00, GDAT06+00 and GDAT07+00.

The top row pattern octal 0 shows the grey scales. The number in the boxes shows the number of binary ONE bits from 0 to 16.

Figure 6:
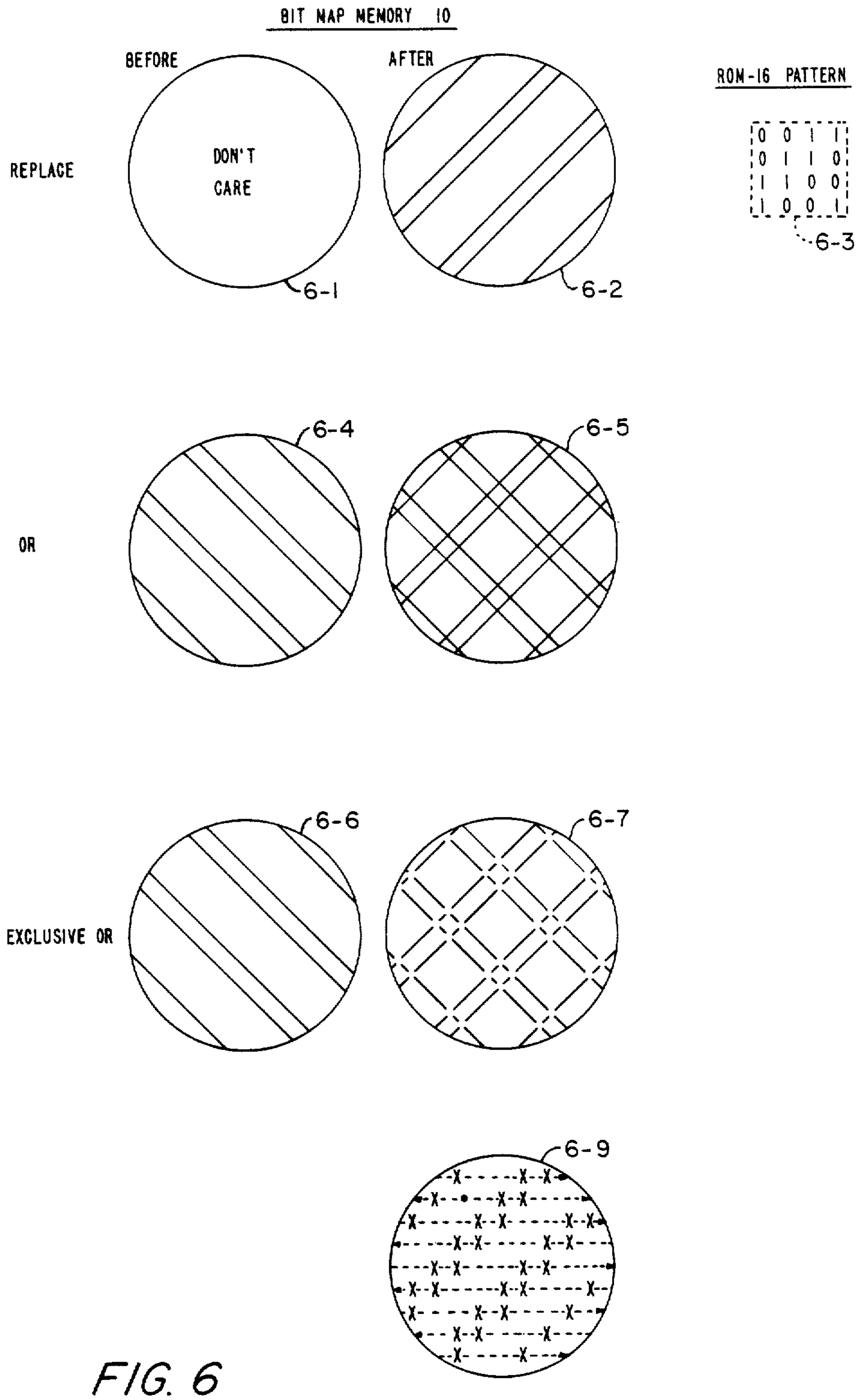
FIG. 6 shows examples demonstrating the various modes of operation during automatic pattern generation.

FIG. 6 shows a number of circles representing a circle displayed on the screen of display 35 and showing the result of the various modes of operation—replace. OR and exclusive OR—filling in the circle with a predetermined pattern.

For the replace operation, circle 6-1 may include any graphics. The microprocessor 17 will address ROM 16 with the pattern select signals GDAT00+00, GDAT01+00 and GDAT02+00 representing octal 2. As seen from FIG. 5, the color select signals GDAT05+00, GDAT06+00 and GDAT07+00 are "don't cares" since all combinations of color select signals will select upward diagonals to the right.

Pattern 6-3 shows the 4 by 4 matrix that is selected by signals GDAT00+00, GDAT01+00, GDAT02+00, GDAT05+00, GDAT06+00 and GDAT07+00. The individual pixels in the matrix are addressed by signals L8AD09+00, L8AD10+00, L8AD19+00 and LWBYTE−00 applied to ROM 16.

Circle 6-2 shows the result of the replace operation; that is, whatever was written in circle 6-1 is replaced by filling circle 6-1 with a mosaic of pattern 6-3, resulting in circle 6-2.

The OR operation is shown by writing a mosaic of pattern 6-3 over circle 6-4 resulting in the filling in of the crosshatch pattern of circle 6-5.

The exclusive OR operation is shown by writing a mosaic of pattern 6-3 over circle 6-6, resulting in circle 6-7. Note that there is no pixel at the intersection of diagonal lines.

Circle 6-9 shows a typical path controlled by microprocessor 17 in filling out the circle with the pattern 6-3. Microprocessor 17 together with the graphics software may retain the image boundaries of the bit map memory 10 or may scan the bit map memory 10 to find the boundaries through XCVR 38 and can execute an instruction to fill in a field, a bit map memory 10 row at a time. from within the field being filled to an outer extremity defined by a pixel. For a particular area, the boundary will be indicated by a pixel on a row. In this case a left pixel and a right pixel will define the boundaries of the area. Each row of the bit map memory 10 area will be filled with the pattern pixels from ROM 16.

This invention is described as relating to a monochromatic graphics display. It should be understood that the concepts described herein may also be applied to a multicolor graphics display wherein there are multiple bit map memories storing pixels for each primary color.

The following read only memory element is described in the "Signetics Bipolar Memory Data Manual" published 1982 by Signetics Corporation, 811 East Arques Avenue, Sunnyvale, Calif. 94086.

ROM 16: 82S185

The following logic elements are described in the "TTL Data Book for Design Engineers", Second Edition, published 1976 by Texas Instruments Incorporated, Dallas, Tex. 75222.

MUXs 14A, 14B: 74LS157
MUX 4: 74S153
XCVR 38: 74LS245
MUX 34: 74S251

Decoder 40: 74S138
Register 18: 74LS174
Register 36: 74S373

The following random access memory element is described in the "Motorola Memory Data Manual, MCM 6664A" published 1982 by Motorola Semiconductor Products, 3801 Ed Bluestein Blvd., Austin, Tex. 78721.

RAM 10: 2674-3

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A display subsystem includes apparatus for displaying predetermined patterns in an area of a display, said apparatus comprising:

read only memory means for storing words specifying predetermined patterns, a predetermined number of words specifying each of said predetermined patterns;

bit map memory means for storing a plurality of bits;

microprocessor means coupled to said read only memory means and said bit map memory means for generating a first plurality of address signals for addressing a first memory location and subsequent memory locations of said read only memory means for reading out said predetermined number of words specifying said each of said predetermined patterns, and generating a second plurality of address signals for addressing a second memory location and subsequent memory locations for reading out a predetermined number of said plurality of bits, each corresponding to one of said predetermined number of words, said microprocessor means further including register means for storing a plurality of mode signals for selecting a REPLACE, OR or EXCLUSIVE OR mode of operation; and logic means coupled to said read only memory means, said bit map memory means and said microprocessor means, and responsive to a first mode signal to logically combine each of said predetermined words with each of said predetermined number of corresponding bits to generate a new bit signal, said bit map memory means having means responsive to said new bit signal for writing a new bit in each location of said bit map memory means specified by said second plurality of address signals;

display means coupled to said bit map memory means for displaying a plurality of pixels each corresponding to said new bit in said each location of said bit map memory means, said plurality of pixels displaying said each of said predetermined patterns.

2. The apparatus of claim 1 wherein said microprocessor means comprises:

a microprocessor for generating said first plurality of address signals for addressing said first location of said read only memory means, said microprocessor generating said second plurality of address signals for addressing said second location of said bit map memory means, said microprocessor further generating a plurality of data signals defining said mode of operation.

3. The apparatus of claim 2 wherein said register means for selecting said mode of operation comprises:

a register coupled to said microprocessor for storing said plurality of data signals and generating said first mode signal and a second mode signal of said plurality of mode signals wherein said first mode signal in a second state and said second mode signal in a second state define said REPLACE mode of operation, said first mode signal in said second state and said second mode signal in a first state define said OR mode of operation, and said first mode signal in a first state and said second mode signal in said second state define said EXCLUSIVE OR mode of operation.

4. The apparatus of claim 1 wherein said first plurality of addressing signals includes signals specifying said one of said predetermined patterns, signals specifying said word within said one of said predetermined patterns and said second mode signal.

5. The apparatus of claim 4 wherein the logic means comprises multiplexer means responsive to said first mode signal wherein bits of a word from the read only memory means are selected to be logically combined with a bit from the bit map memory means.

6. The apparatus of claim 5 wherein the logic means further comprises an AND gate for receiving one of the bits of the word from the read only memory and the bit from the bit map memory means and an EXCLUSIve OR gate for receiving another of the bits of the word from the read only memory means and the output of the AND gate.

7. The apparatus of claim 6 wherein the bit selected by said multiplexer means to be applied to the EXCLUSIVE OR gate from the read only memory means is the value of the pixel of the predetermined pattern to be displayed and the bit selected by said multiplexer means to be applied to the AND gate is a zero for a REPLACE mode, a one for an EXCLUSIVE OR mode, and the value opposite to that of the pixel of the predetermined pattern in an OR mode of operation.

8. The apparatus of claim 1 wherein the logic means comprises multiplexer means responsive to said first mode signal wherein bits of a word from the read only memory means are selected to be logically combined with a bit from the bit map memory means.

9. The apparatus of claim 8 wherein the logic means further comprises an AND gate for receiving one of the bits of the word from the read only memory and the bit from the bit map memory means and an EXCLUSIVE OR gate for receiving another of the bits of the word from the read only memory means and the output of the AND gate.

10. The apparatus of claim 9 wherein the bit selected by said multiplexer means to be applied to the EXCLUSIVE OR gate from the read only memory means is the value of the pixel of the predetermined pattern to be displayed and the bit selected by said multiplexer means to be applied to the AND gate is a zero for a REPLACE mode, a one for an EXCLUSIVE OR mode, and the value opposite to that of the pixel of the predetermined pattern in an OR mode of operation.

* * * * *